April 1, 1941.  H. R. MATTHEWS  2,237,236
BOLT
Filed Dec. 7, 1939
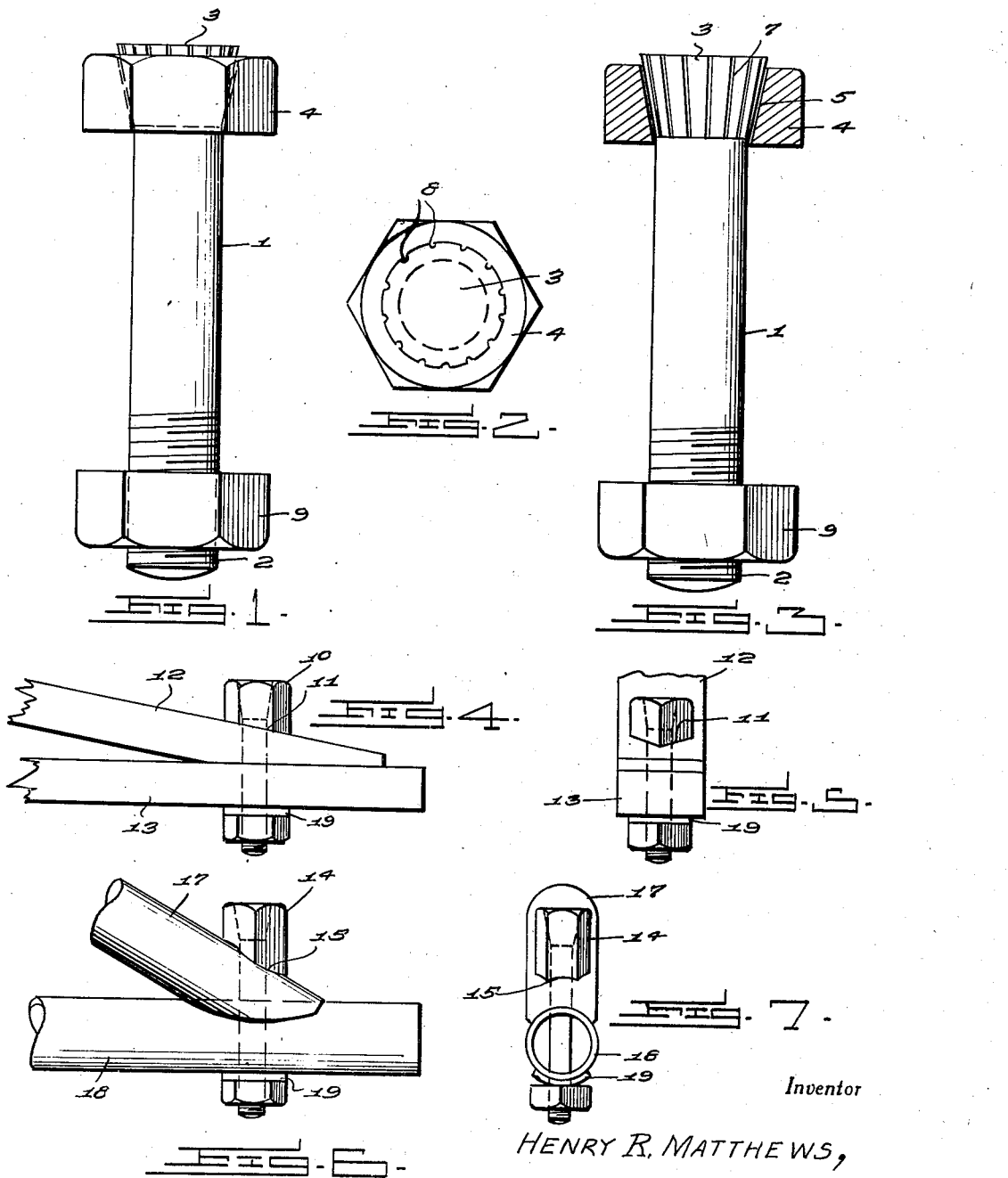
Inventor
HENRY R. MATTHEWS,
By Clarence A. O'Brien
and Hyman Berman
Attorneys Patented Apr. 1, 1941

2,237,236

UNITED STATES PATENT OFFICE 2,237,236

BOLT

Henry R. Matthews, Santa Monica, Calif.

Application December 7, 1939, Serial No. 308,061

1 Claim. (Cl. 85—9)

My invention relates to improvements in bolts for use more particularly in structural iron work, although, as will presently appear, it is equally well adapted for general use.

The primary object of the invention is to provide a bolt adapted for use with interchangeable heads so that it may be drawn flush against flat or oblique work surfaces as desired and angle washers eliminated in connection with oblique work.

Another object is to provide a bolt of the type and for the purpose above set forth which is inexpensive to manufacture, easily applied and strong and durable.

To the accomplishment of the above, and subordinate objects presently appearing, a preferred embodiment of my invention has been illustrated in the accompanying drawing, set forth in detail in the succeeding description, and described in the claim appended hereto.

In said drawing:

Figure 1 is a view in side elevation of the preferred embodiment of my invention showing the shank as equipped with a flat type head, Figure 2 is a view in end elevation, Figure 3 is a view similar to Figure 1 with the head shown in section, Figure 4 is a view in side elevation illustrating the shank equipped with an optional form of head for use on oblique work inclined at an angle, Figure 5 is an end view of the parts shown in Figure 4, Figure 6 is a view in side elevation illustrating the shank equipped with another form of head for use on oblique work inclined at another angle, and Figure 7 is an end view of the parts shown in Figure 6.

Referring to the drawing by numerals, the bolt of my invention shown therein comprises a round shank 1 having a threaded tail end 2 and an outwardly flaring head end portion 3 preferably round transversely and flat on top. The head end portion 3 is adapted to fit into an axially bored, preferably hexagonal, head 4, the bore of which tapers inwardly of said head in conformity with the shape of the head portion 3. The head portion 3 at its smaller end is of the same diameter as that of the shank 1, and the bore 5 is of the same diameter as that of said head portion 3 so that said head may be slipped over and along said shank to and over said portion 3. The head portion 3 is grooved, or serrated, longitudinally, as at 7, so as to provide sharp edges 8 for biting into the head 4. To facilitate such biting and consequent interlocking of the head 4 with the head portion 3, said head may be constructed of softer metal than said portion 3. The usual nut 9 is utilized on the tail end 2.

The manner in which the described bolt functions will be readily understood. Turning of the nut 9 onto the shank 1 draws the head portion 3 into the bore 5 of the head 4 with a wedging action causing the sharp edges 8 to bite into said head so that the portion 3 and head 4 interlock tightly against relative turning.

As previously stated, my invention comprehends providing different, interchangeable, types of heads for the head portion 3 according to the different structures in which the bolt is used.

In Figures 1 to 3, the head 4 is of the usual flat type for fitting flush against ordinary straight work.

In Figures 4 and 5 the shank 1 is shown as equipped with a form of head 10, similar in all respects to head 4, except that it is provided with an oblique inner face 11 for fitting flush against, for instance, an oblique strut 12 on a bar 13.

In Figures 6 and 7 the shank 1 has been shown as equipped with still another form of head 14 similar to head 10 with the exception that the inner face 15 thereof is inclined at an angle different to that of face 11 of head 10 and is slightly concave, as indicated, to fit against a round strut 17 inclined from a bar 18 at a different angle than strut 12.

In any use of the described bolt, the usual washer 19 may be utilized between the nut and the work as shown for instance, in Figures 4 to 6.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

A bolt comprising a shank part provided at one end thereof with an outwardly flaring head portion of inverted frusto-conical form, and a head member apertured to receive said head portion and in conformity with the shape of said portion, whereby said portion and head are adapted for interfitting relation with a wedging action, said head portion being longitudinally serrated to provide sharp edges for biting action into said head, and said head being of softer metal than said portion to facilitate such biting action and having a flat inner face fitting flush against an object.

HENRY. R. MATTHEWS.